(12) United States Patent
Chen et al.

(10) Patent No.: US 7,099,531 B2
(45) Date of Patent: Aug. 29, 2006

(54) COMPENSATING FOR CHROMATIC DISPERSION IN OPTICAL FIBERS

(75) Inventors: Yong Qin Chen, San Jose, CA (US); Fei Zhu, San Jose, CA (US)

(73) Assignee: Chromatic Micro Optics, Inc., San Jose, CA (US)

( * ) Notice: Subject to any disclaimer, the term of this patent is extended or adjusted under 35 U.S.C. 154(b) by 350 days.

(21) Appl. No.: 10/619,814

(22) Filed: Jul. 15, 2003

(65) Prior Publication Data

US 2004/0013361 A1    Jan. 22, 2004

Related U.S. Application Data

(60) Provisional application No. 60/396,321, filed on Jul. 16, 2002.

(51) Int. Cl.
    G02B 6/26    (2006.01)
(52) U.S. Cl. .................................. 385/31; 398/147
(58) Field of Classification Search ................ 385/31, 385/33, 36, 37, 38; 398/147–150
    See application file for complete search history.

(56) References Cited

U.S. PATENT DOCUMENTS 5,835,517 A * 11/1998 Jayaraman et al. ........... 372/50
6,008,920 A * 12/1999 Hendrix ..................... 398/79
6,481,861 B1 * 11/2002 Cao et al. .................. 359/868
2002/0012179 A1    1/2002 Cao et al.
2002/0044364 A1 * 4/2002 Shirasaki et al. ........... 359/868
2003/0128431 A1 * 7/2003 Mitamure et al. .......... 359/577

FOREIGN PATENT DOCUMENTS

| GB | 2 245 790 A | 8/1992 |
|---|---|---|
| WO | WO 02/03123 A2 | 1/2002 |
| WO | WO 03/009032 A1 | 1/2003 |

* cited by examiner

*Primary Examiner*—Sung Pak
(74) *Attorney, Agent, or Firm*—Donald E. Schreiber

(57) ABSTRACT

An optical chromatic dispersion compensator (60) betters optical communication system performance. The dispersion compensator (60) includes a collimating means (61) that receives a spatially diverging beam of light from an end of an optical fiber (30). The collimating means (61) converts the spatially diverging beam into a mainly collimated beam that is emitted therefrom. An optical phaser (62) receives the mainly collimated beam from the collimating means (61) through an entrance window (63), and angularly disperses the beam in a banded pattern that is emitted from the optical phaser (61). A light-returning means (66) receives the angularly dispersed light and reflects it back through the optical phaser (62) to exit the optical phaser near the entrance window (63) thereof.

19 Claims, 8 Drawing Sheets

Alternative Shapes for the Curved Mirror 68

FIG. 12

COMPENSATING FOR CHROMATIC DISPERSION IN OPTICAL FIBERS

CLAIM OF PROVISIONAL APPLICATION RIGHTS

This application claims the benefit of U.S. Provisional Patent Application No. 60/396,321 filed on Jul. 16, 2002.

BACKGROUND OF THE INVENTION

1. Field of the Invention

The present invention relates generally to the technical field of fiber optic communication, and, more particularly, to compensating for chromatic dispersion that accumulates as light propagates through a communication system's optical fiber.

2. Description of the Prior Art

Increasing demand for low-cost bandwidth in optical fiber communication systems provides motivation for increasing both bit-rate/transport-distance, and the number of wavelength-division multiplexed ("WDM") channels which an optical fiber carries. A principal limiting factor in high bit-rate, long-distance optical communication systems is chromatic dispersion which occurs as light propagates through an optical fiber. Chromatic dispersion causes a light wave at one particular wavelength to travel through an optical fiber at a velocity which differs from the propagation velocity of a light wave at a different wavelength. As a consequence of chromatic dispersion, optical pulses, which contain multiple wavelength components, become significantly distorted after traveling through a sufficiently long optical fiber. Distortion of optical pulses degrades and loses information carried by the optical signal.

Chromatic dispersion of optical fibers can be characterized by two (2) parameters:

1. a group velocity dispersion ("GVD") which is the rate of group velocity change with respect to wavelength; and
2. a dispersion slope which is the rate of dispersion change with respect to wavelength.

For a typical optical fiber communication system carrying a broad range of wavelengths of light, such as a WDM system or systems with directly modulated lasers or Fabry-Perot lasers, it is necessary to compensate both for GVD and for dispersion slope across the entire range of wavelengths propagating through the optical fiber.

Over the years, several different types of optical fibers each of which exhibits different chromatic dispersion characteristics have been used in assembling optical communication systems. The dispersion characteristics exhibited by these different types of optical fibers depend on the length of an optical fiber, the type of optical fiber, as well as how the optical fiber was manufactured, cabling of the optical fiber, and other environmental conditions. Therefore, to compensate for chromatic dispersion exhibited by these various different types of optical fibers it is desirable to have a single type of chromatic dispersion compensating device which provides variable GVD and dispersion slope to thereby simplify inventory control and optical communication network management.

Figure 1A:
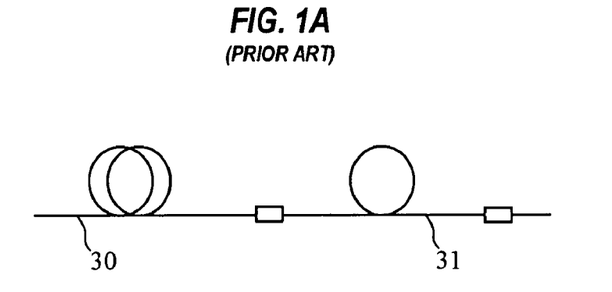
FIG. 1A is a schematic diagram depicting a prior art technique for chromatic dispersion compensation which uses a special dispersion compensating optical fiber for reducing chromatic dispersion in an optical communication system.

Several solutions have been proposed to mitigate chromatic dispersion in optical fiber communication systems. One technique used in compensating for chromatic dispersion, shown schematically in FIG. 1A, inserts a relatively short length of a special dispersion compensation optical fiber ("DCF") 31 in series with a conventional transmission optical fiber 30. The DCF 31 has special cross-section index profile and exhibits chromatic dispersion which opposes that of the optical fiber 30. Connected in this way, light, which in propagating through the optical fiber 30 undergoes chromatic dispersion, then propagates through the DCF 31 which cancels the chromatic dispersion due to propagation through the optical fiber 30. However to obtain chromatic dispersion which opposes that of the optical fiber 30, the DCF 31 has much smaller mode field diameter than that of the optical fiber 30, and therefore the DCF 31 is more susceptible to nonlinear effects. In addition, it is difficult to use a DCF 31 operating in its lowest spatial mode for complete cancellation both of GVD and of dispersion slope exhibited by two particular types of optical fibers, i.e. dispersion-shifted optical fibers ("DSF"), and non-zero dispersion shifted optical fibers ("NZDF").

Figure 1B:
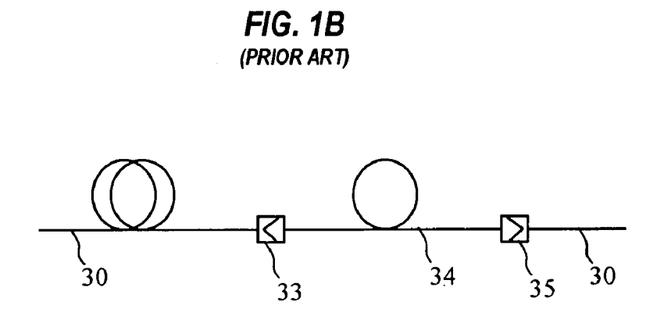
FIG. 1B is a schematic diagram depicting a prior art technique for chromatic dispersion compensation which uses mode converters and a high-mode dispersion compensating optical fiber for reducing chromatic dispersion in an optical communication system.

An alternative inline chromatic dispersion compensation technique, shown schematically in FIG. 1B, inserts a first mode converter 33, which receives light that has propagated through a length of the first optical fiber 30, between the first optical fiber 30 and a high-mode DCF 34. After passing through the high-mode DCF 34, light then passes through a second mode converter 35 and into a second length of the optical fiber 30. Similar to the DCF 31 of FIG. 1A, the high-mode DCF 34 exhibits chromatic dispersion which opposes that of the optical fibers 30, while supporting a single higher order spatial mode than that supported by the DCF 31. The mode field diameter of high-mode DCF 34 for the higher order spatial mode is comparable to that of both optical fibers 30. Thus, the mode converter 33 converts light emitted from the first optical fiber 30 into the higher order spatial mode supported by the high-mode DCF 34, while the mode converter 35 reverses that conversion returning light from the higher order spatial mode emitted from the high-mode DCF 34 to a lower order spatial mode for coupling back into the second optical fiber 30. One problem exhibited by the apparatus illustrated in FIG. 1B is that it is difficult to completely convert light from one spatial mode to another. Another problem is that it is also difficult to keep light traveling in a single higher order spatial mode. For this reason, integrity of a signal being compensated for chromatic dispersion by the apparatus illustrated in FIG. 1B is susceptible to modal dispersion, caused by differing group velocities for light propagating in multiple different spatial modes.

Due to the difficulties in mode matching a DCF to various different types of optical fibers 30 in the field, it is impractical to adjust chromatic dispersion exhibited by DCF's to that required by a particular optical fiber 30. In addition, DCF's also exhibit high insertion loss. This loss of optical signal strength must be made up by optical amplifiers. Thus, compensating for chromatic dispersion using DCF's significantly increases the overall cost of an optical communication system.

Figure 2:
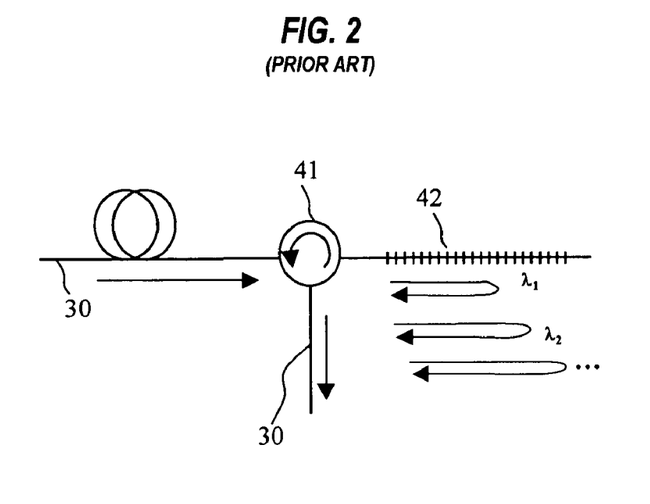
FIG. 2 is a schematic diagram depicting a prior art technique for chromatic dispersion compensation which uses a fiber Bragg grating for reducing chromatic dispersion in an optical communication system.

A different technique, shown schematically in FIG. 2, uses a chirped fiber Bragg grating 42 to provide chromatic dispersion compensation. Differing wavelength components of a light pulse emitted from the optical fiber 30 enter the chirped grating 42 through a circulator 41 to be reflected back towards the circulator 41 from different sections of the chirped grating 42. A carefully designed chirped grating 42 can therefore compensate for chromatic dispersion accumulated in the optical fiber 30. The amount of chromatic dispersion provided by the chirped grating 42 can be adjusted by changing the stress and/or temperature of the grating fiber. Unfortunately, a Bragg grating reflects only a narrow band of the WDM spectrum. Multiple chirped gratings 42 can be cascaded to extend the spectral width. However, cascading multiple chirped gratings 42 results in an expensive chromatic dispersion compensation device.

Figure 3A:
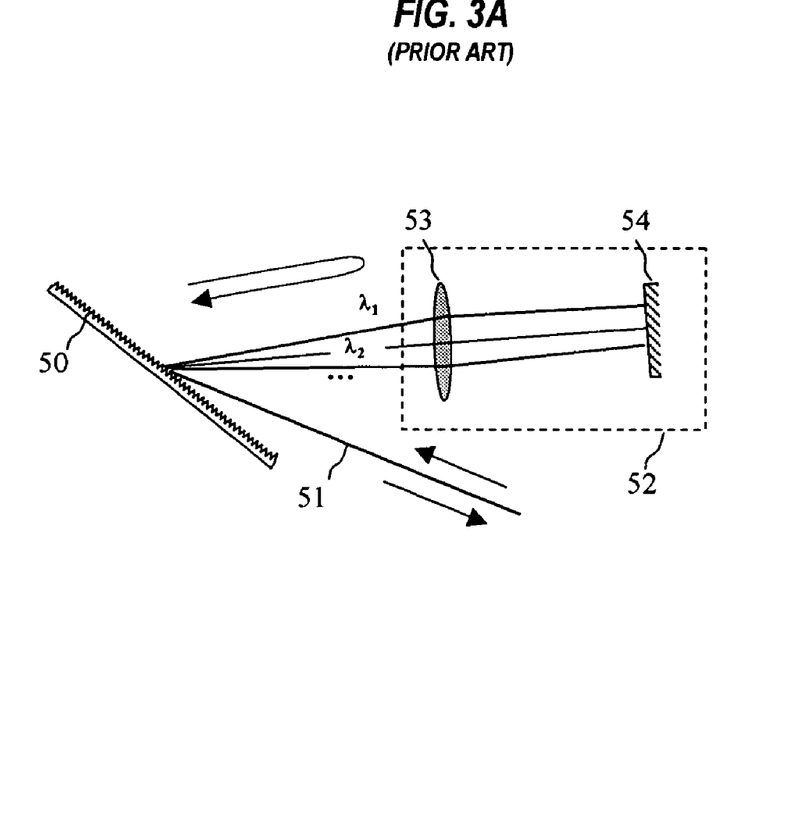
FIG. 3A is a schematic diagram depicting a prior art technique for chromatic dispersion compensation which uses a bulk diffraction grating and a light-returning device for reducing chromatic dispersion in an optical communication system.

Yet another technique, shown schematically in FIG. 3A, employs bulk diffraction gratings 50 for chromatic dispersion compensation. Specifically, light exiting-the transmission optical fiber 30 is first formed into a collimated beam 51. The bulk diffraction grating 50 is then used to generate angular dispersion (rate of diffraction angle change with respect to the wavelength) from the collimated beam 51. A light-returning device 52, which typically consists of a lens 53 followed by a mirror 54 placed at the focal plane of the lens 53, reflects the diffracted light back onto the diffraction grating 50. Reflection of the diffracted light back onto the diffraction grating 50 converts the angular dispersion into chromatic dispersion. A circulator inserted along the path of the collimated beam 51 may be used to separate chromatic dispersion compensated light leaving the diffraction grating 50 from the incoming collimated beam 51. In the apparatus depicted in FIG. 3a, the amount of chromatic dispersion may be adjusted by varying the distance between the diffraction grating 50 and the lens 53, and/or the curvature of the beam-folding mirror 54. However, the bulk diffraction grating 50 produces only a small angular dispersion. Consequently, using the apparatus depicted in FIG. 3A to compensate for the large chromatic dispersion which occurs in optical communication systems requires an apparatus that is impractically large.

Figure 3B:
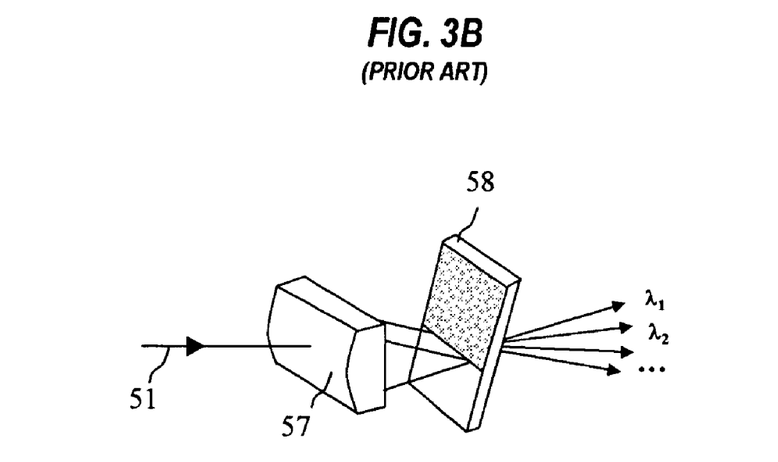
FIG. 3B is a schematic diagram depicting a prior art technique for chromatic dispersion compensation which uses a VIPA to produce large angular dispersions required for reducing chromatic dispersion in an optical communication system.

An analogous chromatic dispersion compensation technique replaces the diffraction grating 50 with a virtually imaged phased array ("VIPA") such as that described in U.S. Pat. No. 6,390,633 entitled "Optical Apparatus Which Uses a Virtually Imaged Phased Array to Produce Chromatic Dispersion" which issued May 21, 2002, on an application filed by Masataka Shirasaki and Simon Cao ("the '633 patent"). As illustrated in FIG. 3B, which reproduces FIG. 7 of the '633 patent, the VIPA includes a line-focusing element, such as a cylindrical lens 57, and a specially coated parallel plate 58. A collimated beam 51 enters the VIPA through the line-focusing cylindrical lens 57 at a small angle of incidence, and emerges from the VIPA with large angular dispersion. In combination with the light-returning device 52 illustrated in FIG. 3A, the VIPA can generate sufficient chromatic dispersion to compensate for dispersion occurring in an optical fiber transmission system. Unfortunately, the VIPA distributes the energy of the collimated beam 51 into multiple diffraction orders. Because of each diffraction order exhibits different dispersion characteristics, only one of the orders can be used in compensating for chromatic dispersion. Consequently, the VIPA exhibits high optical loss, and implementing dispersion slope compensation using a VIPA is both cumbersome and expensive. The VIPA also introduces high dispersion ripple, i.e., rapid variation of residue dispersion with respect to wavelength, which renders the VIPA unsuitable for inline chromatic dispersion compensation.

Another technique which may be used in compensating for chromatic dispersion is an all-pass filter. An all-pass filter is a device that exhibits a flat amplitude response and periodic phase response to an incoming optical signal. Since as known to those skilled in the art chromatic dispersion is the second derivative of phase delay, an all-pass filter may therefore be used in compensating for chromatic dispersion. Typical implementations of all-pass filters in compensating for chromatic dispersion are Gires-Tournois interferometers and loop mirrors. An article entitled "Optical All-Pass Filters for Phase Response Design with Applications for Dispersion Compensation" by C. Madsen and G. Lenz published in IEEE Photonic Technology Letters, Vol. 10, No. 7 at p. 944 (1998) discloses how all-pass filters may be used for compensating chromatic dispersion. Problems in using all-pass filters in compensating for chromatic dispersion include their introduction of high dispersion ripple, or an inability to produce sufficient dispersion compensation for practical applications. Consequently, all-pass filters are also unsuitable for inline chromatic dispersion compensation.

Because compensating for chromatic dispersion is so important in high-performance optical fiber communication systems, a simple adjustable dispersion compensator having low dispersion ripple, relatively low insertion loss, and which can compensate for various different types of chromatic dispersion exhibited by the various different types of optical fibers already deployed in fiber optic transmission systems would be highly advantageous for increasing both bit-rate/transport-distance, and the number of WDM channels carried by an optical fiber.

BRIEF SUMMARY OF THE INVENTION

The present invention provides a method and an apparatus which produces an adjustable amount of chromatic dispersion, and which is practical for compensating chromatic dispersion of optical fiber systems.

An object of the present invention is to provide chromatic dispersion compensation which exhibits low dispersion ripple.

Another object of the present invention is to provide chromatic dispersion compensation which exhibits relatively low insertion loss.

Another object of the present invention is to provide practical chromatic dispersion compensation.

Another object of the present invention is to provide chromatic dispersion compensation which can compensate for various different types of chromatic dispersion exhibited by the various different types of optical fibers that are already deployed, or which may be deployed in the future, in fiber optic transmission systems.

Another object of the present invention is to provide chromatic dispersion compensation which increases bit-rate/transport-distance.

Another object of the present invention is to provide chromatic dispersion compensation which increases the number of WDM channels which an optical fiber can carry.

Another object of the present invention is to provide chromatic dispersion compensation which concurrently compensates both for GVD and dispersion slope.

Another object of the present invention is to provide chromatic dispersion compensation which concurrently compensates both for GVD and dispersion slope across an entire range of wavelengths propagating through an optical fiber.

Another object of the present invention is to provide chromatic dispersion compensation which is less susceptible to nonlinear effects.

Another object of the present invention is to provide chromatic dispersion compensation which does not require converting light between differing spatial modes.

Another object of the present invention is to provide chromatic dispersion compensation which is less susceptible to modal dispersion.

Another object of the present invention is to provide an apparatus for chromatic dispersion compensation which occupies a comparatively small amount of space.

Another object of the present invention is to provide cost effective chromatic dispersion compensation for optical communication systems.

Briefly, the present invention is an optical chromatic dispersion compensator and a method of operation thereof which is adapted for bettering performance of an optical communication system. In a preferred embodiment the chromatic dispersion compensator includes a collimating means for receiving a spatially diverging beam of light which contains a plurality of frequencies as may be emitted from an end of an optical fiber included in an optical communication system. The collimating means converts the spatially diverging beam of light into a mainly collimated beam of light that is emitted from the collimating means.

The chromatic dispersion compensator also includes an optical phaser which provides an entrance window for receiving the mainly collimated beam of light from the collimating means. The optical phaser angularly disperses the received beam of light in a banded pattern that is emitted from the optical phaser. In this way the beam of light received by the optical phaser becomes separated into bands so that light having a particular frequency within a specific band is angularly displaced from light at other frequencies within that same band.

Finally, the chromatic dispersion compensator includes a light-returning means which receives the angularly dispersed light having the banded pattern that is emitted from the optical phaser. The light-returning means reflects that light back through the optical phaser to exit the optical phaser near the entrance window thereof.

These and other features, objects and advantages will be understood or apparent to those of ordinary skill in the art from the following detailed description of the preferred embodiment as illustrated in the various drawing figures.

DETAILED DESCRIPTION

Figure 4:
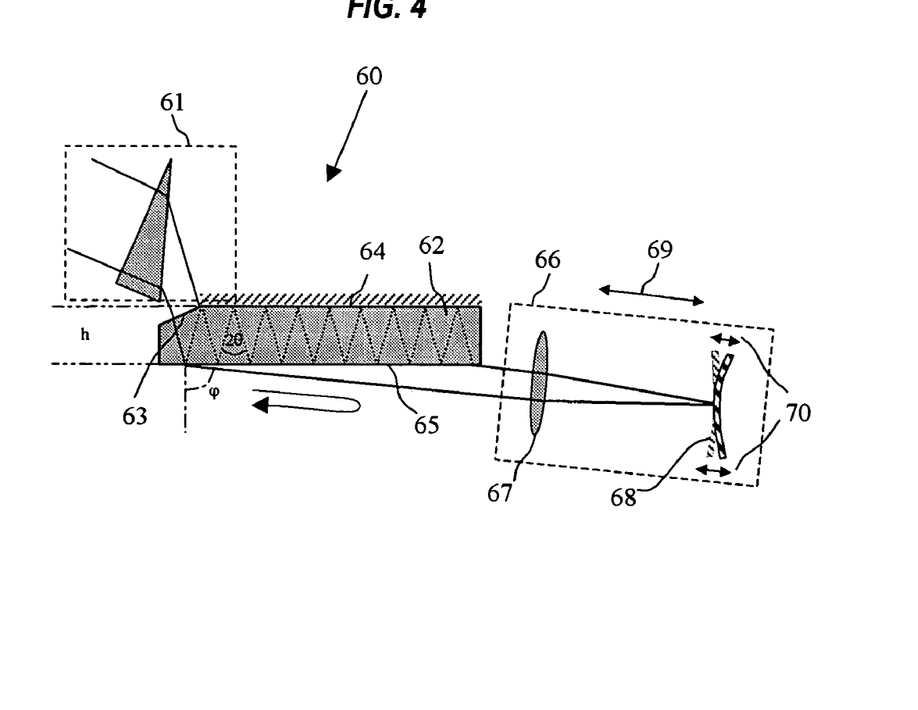
FIG. 4 is a schematic diagram depicting one embodiment of a chromatic dispersion compensation apparatus in accordance with the present invention which includes a light-coupling means, an optical phaser, and a light-reflecting means.

FIG. 4 depicts an embodiment of an optical chromatic dispersion compensator in accordance with the present invention referred to by the general reference character 60. In one embodiment, the dispersion compensator 60 includes three basic elements, a collimating means 61, an optical phaser 62, and a light-returning means 66. The optical phaser 62, explained in greater detail below, includes an entrance window 63 and two parallel surfaces 64, 65. The light-returning means 66, also explained in greater detail below, includes a light-focusing element 67 and a curved mirror 68 that is located near the focal plane of the light-focusing element 67.

Figure 5A:
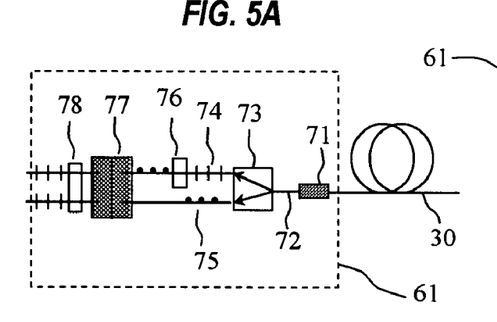
FIG. 5A is a schematic diagram depicting a plan view of a prism based light-coupling means illustrated in FIG. 4 of one embodiment of the present invention.

As illustrated in FIG. 5A, a preferred embodiment of the collimating means 61 includes a collimator 71 which receives a spatially diverging beam of light emitted from an end of the optical fiber 30. As is apparent to those skilled in the art, light emitted from the end of the optical fiber 30 may be polarized in two mutually orthogonal planes due to the light's passage through the optical fiber 30. The collimator 71 converts the spatially diverging beam of light emitted from an end of the optical fiber 30 into to a collimated beam 72 which, when emitted from the collimator 71 into free space, retains the two mutually orthogonal polarizations. The collimated beam 72 impinges upon a birefringent plate 73 that separates the incoming collimated beam 72 into two spatially distinguishable components having perpendicular polarizations 74, 75. Light having the polarization 74 then passes through a first half-wave plate 76 that rotates that light so the polarizations of both beams lie in the same plane. The two beams of light now both having polarizations which lie in the same plane impinge upon a prism 77 that slightly angularly disperses both beams. Both slightly angularly dispersed beams impinge upon a second half-wave plate 78 that rotates the polarizations of both beams by ninety degrees (90°).

Figure 5B:
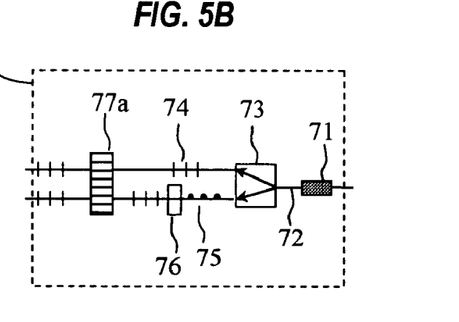
FIG. 5B is a schematic diagram depicting a plan view of a bulk diffraction grating based light-coupling means illustrated in FIG. 4 of an alternative embodiment of the present invention.

An alternative embodiment of the collimating means 61 illustrated in FIG. 5B replaces the prism 77 with a bulk diffraction grating 77a to obtain a like amount of angular dispersion. This alternative embodiment of the collimating means 61, which includes the bulk diffraction grating 77a, omits the second half-wave plate 78.

Regardless of whether the collimating means 61 uses a prism 77 or a bulk diffraction grating 77a, as discussed in greater detail below the collimating means 61 emits a mainly collimated beam of light. It should also be noted that chromatic dispersion compensation in optical transport systems for which control of the dispersion slope is not critical, such as in systems involving a limited range of wavelengths or a comparatively short optical fiber 30, the prism 77 or the bulk diffraction grating 77a can be eliminated with little effect on performance of the dispersion compensator 60. Moreover, those skilled in the art will understand that the optical arrangements respectively depicted in FIGS. 5A and 5B can be simplified significantly if the light exiting the optical fiber 30 has a well-defined polarization, such as light coming directly from a laser or any other type device which maintains a single, planar polarization.

Light emitted from the collimating means 61 enters the optical phaser 62 through the entrance window 63 to be reflected back and forth between the parallel surfaces 64, 65 along the length of the optical phaser 62. The optical arrangement of either embodiment of the collimating means 61, respectively illustrated in FIGS. 5A and 5B, establish polarizations for the beams impinging upon the entrance window 63 which are perpendicular to the incidence plane. Due to the polarization of light impinging upon the entrance window 63, beams of light impinging upon the surface 65 internally within the optical phaser 62 at an angle of incidence which is near the critical angle will be mostly reflected from the surface 65 even if the surface 65 lacks any optical coating.

For use in present optical communication systems, the optical phaser 62 is preferably a plate of solid silicon, although it may also be made of any other material which:

1. is transparent to light propagating through the optical phaser 62; and
2. has index of refraction greater than the surrounding medium.

One of the two parallel surfaces of the optical phaser 62, surface 64, is preferably coated with a high reflectivity film, for example a film having a reflectivity greater than ninety-eight percent (98%) at the wavelength of light impinging thereon. Consequently, the surface 64 is herein referred to as the "reflective surface." The other surface 65 is preferably polished, although it may also be coated with a film of partial reflectivity, for example, with a film having a reflectivity of approximately eighty percent (80%) at the wavelength of light impinging thereon. The surface 65 is herein referred to as the "defractive surface."

One corner of the solid optical phaser 62 constituting the entrance window 63 is beveled. The beveled entrance window 63 is coated with an anti-reflective film to facilitate beams entering into the optical phaser 62 therethrough. After the beams enter the optical phaser 62 through the entrance window 63 at near normal incidence, they split into two portions at each successive impingement upon the defractive surface 65 of the optical phaser 62. As explained above, most of each beam reflects internally within the optical phaser 62 upon impinging upon the surface 65. The portion of each beam which does not reflect from the surface 65 exits the optical phaser 62 through the surface 65 by refraction. The configuration of the optical phaser 62 preferably orients each beam's impingement upon the surface 65 to be at an angle of incidence, i.e. θ, which is slightly less than the critical angle. Consequently, this configuration for the optical phaser 62 means that refraction of light at the surface 65 occurs near grazing emergence at an angle, i.e. φ, which is greater than forty-five degrees (45°) from a normal to the defractive surface 65. That portion of each beam reflected at the surface 65 continues reflecting back and forth between the two parallel surfaces 64, 65 of the optical phaser 62 with a portion of the beam refracting out of the optical phaser 62 at each impingement of the beam on the surface 65. Each time the beam encounters the defractive surface 65, a small portion of the beam exits the optical phaser 62 by refraction. Constructive interference occurs between all beams emerging from the surface 65 if the optical path delay between successive reflections, i.e. Δp, equals an integer multiple of the wavelength, i.e. λ, of light entering the optical phaser 62.

$$\Delta p = 2hn \cos \theta = m\lambda \qquad (1)$$

or $$4h^2(n^2 - \sin^2 \phi) = m^2 \lambda^2 \qquad (2)$$

where
  n is the index of refraction of material forming the optical phaser 62
  θ is the angle of incidence on the surface 65 of light reflecting internally inside the optical phaser 62
  φ is the angle of refraction of light exiting the optical phaser 62 through the surface 65
  h is the thickness of the optical phaser 62
  m is the order of interference The angular dispersion capability of the optical phaser 62, set forth in the relationship (3) below, can be derived from equation (2).

$$\frac{\delta \varphi}{\delta \lambda} \approx \frac{n^2 - \sin^2 \varphi}{\lambda \sin \varphi \cos \varphi} \qquad (3)$$

The optical phaser 62 produces a large angular dispersion of light exiting through the surface 65 if φ is near critical angle. A large angular dispersion may also be realized if φ approaches normal to the surface 65 of the optical phaser 62. The latter orientation for light emitted from the surface 65 corresponds to the orientation of light emitted from the parallel plate 58 of a VIPA.

Figure 6A:
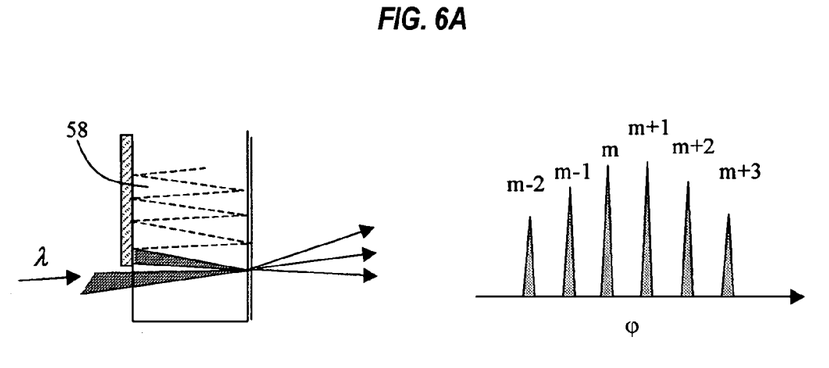
FIG. 6A is a schematic diagram depicting a diffraction pattern produced by the prior art VIPA for a beam of light having a single wavelength.
Figure 6B:
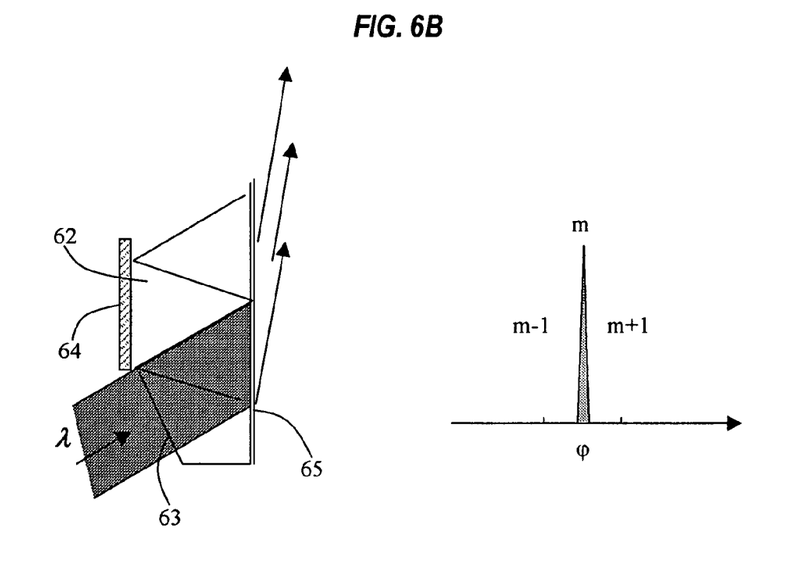
FIG. 6B is a schematic diagram depicting a diffraction pattern produced by an optical phaser in accordance with the present invention for a beam of light having a single wavelength.

Although both the optical phaser 62 and VIPA have similar angular dispersion capabilities, their diffraction patterns differ significantly. As illustrated schematically in FIG. 6A, the beam waist inside the parallel plate 58 of the VIPA must be very small to simultaneously reduce both the angle φ and loss of optical energy. Consequently, for a given wavelength of light λ the narrow beam waist within the parallel plate 58 of the VIPA produces a large angular divergence of refracted beams. In other words, the energy of light diffracted by the VIPA is distributed into multiple orders. Due to the different diffraction properties of the beams of different order, as stated previously for the VIPA only one of the diffraction orders may be used for dispersion compensation. Consequently, the VIPA is an inherently high-loss device. Alternatively, the beam width inside the optical phaser 62 is similar to the thickness h of the optical phaser 62. This wide beam width within the optical phaser 62 causes optical energy of light refracted at the surface 65 to be mainly concentrated in a single order for any beam of light at a particular wavelength as illustrated schematically in FIG. 6B.

To compensate chromatic dispersion in an optical communication system containing multiple WDM channels, it is preferable to design the beam incidence angle inside the optical phaser 62, θ, in accordance with the following equation (4).

$$\cos\theta = \frac{c}{2h\Delta f n} \quad (4)$$

where c is the speed of light

Δf is the frequency separation between adjacent WDM channels.

Note that n, the index of refraction of the optical phaser 62, is wavelength dependent. The incidence angle θ therefore varies with wavelength. In particular, for light of each WDM channel $\lambda_i$, there exists a specific incidence angle $\theta_i$. Angular spreading of the light beam inside the optical phaser 62 is enabled by the angular dispersion produced by the prism 77 or bulk diffraction grating 77a of the collimating means 61. If the incidence angle θ is near the angle of total internal reflection, as preferred for the current embodiment, the optical phaser 62 not only produces large angular dispersion at a particular wavelength as shown by relationship (3), the optical phaser 62 also amplifies angular dispersion of the collimating means 61. Amplification of the angular dispersion provides a means for reducing dispersion ripple.

To reduce loss of light entering the optical phaser 62 from the collimating means 61 and to also produce preferably only one order for any beam of light at a particular wavelength in the diffraction pattern of the beam exiting the surface 65 of the optical phaser 62, or perhaps a few orders, the angular dispersion produced by the collimating means 61, i.e. the collimation of the beam emitted by the collimating means 61, preferably has a beam waist $w_o$ in the plane of the plate that is perpendicular to the parallel surfaces 64, 65 in accordance with relationship (5) below.

$$w_o \approx h \sin\theta \quad (5)$$

where h is the thickness of the optical phaser 62

θ is the angle of incidence on the surface 65 of light reflecting internally inside the optical phaser 62

Collimating the beam of light emitted from the collimating means 61 in accordance with relationship (5) above ensures that more than fifty-percent (50%) of the energy in the mainly collimated beam of light impinging upon the entrance window 63 diffracts into fewer than three (3) diffraction orders for any beam of light at a particular wavelength in the angularly dispersed light emitted from the optical phaser in the banded pattern.

Figures 7A, 7B, 7C:
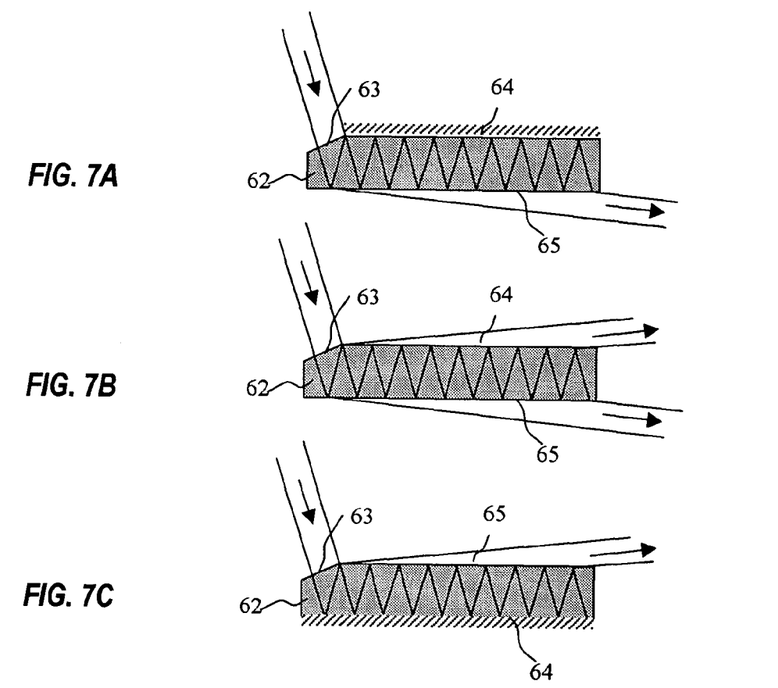
FIGS. 7A, 7B, 7C, 7D, 7E and 7F are schematic diagrams depicting various different configurations for exemplary embodiments of the optical phaser all in accordance with the present invention.
Figure 7D:
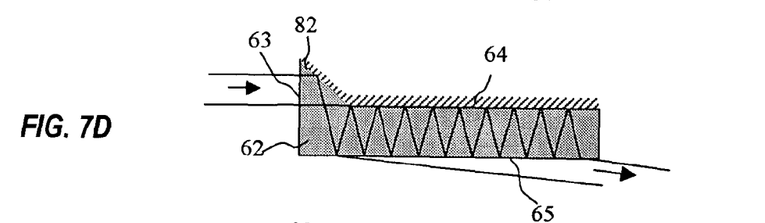
Figure 7E:
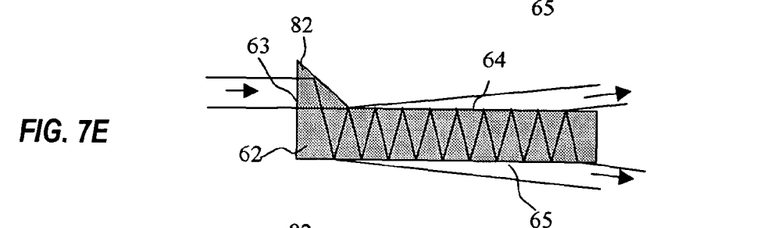
Figure 7F:
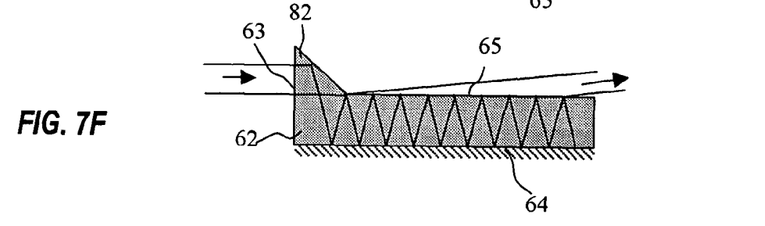

Several alternative embodiments for the optical phaser 62 are illustrated in FIGS. 7A through 7F. In those various alternative embodiments of the optical phaser 62, the entrance window 63 may be formed either by a beveled surface as illustrated in FIG. 4, or by a prism 82 that projects out of one of the parallel surfaces 64, 65 as illustrated in FIGS. 7D through 7F. Light entering the entrance window 63 of the prism 82 reflects internally within the prism 82 before impinging for a first time on one of the parallel parallel surfaces 64 or 65. As illustrated for the various alternative embodiments, the reflective surface 64 may either be coated with a high-reflectivity film or be partially transparent. If the surface 64 is partially transparent, the optical phaser 62 exhibits greater optical loss. However, for such configurations of the optical phaser 62 light leaking from the surface 64 may be used for performance monitoring. It should be noted that if the reflectivities of the parallel surfaces 64, 65 were made polarization independent by special optical coatings, polarization control produced by the collimating means 61 for light impinging upon the entrance window 63 of the optical phaser 62 is unnecessary.

Figure 8A:
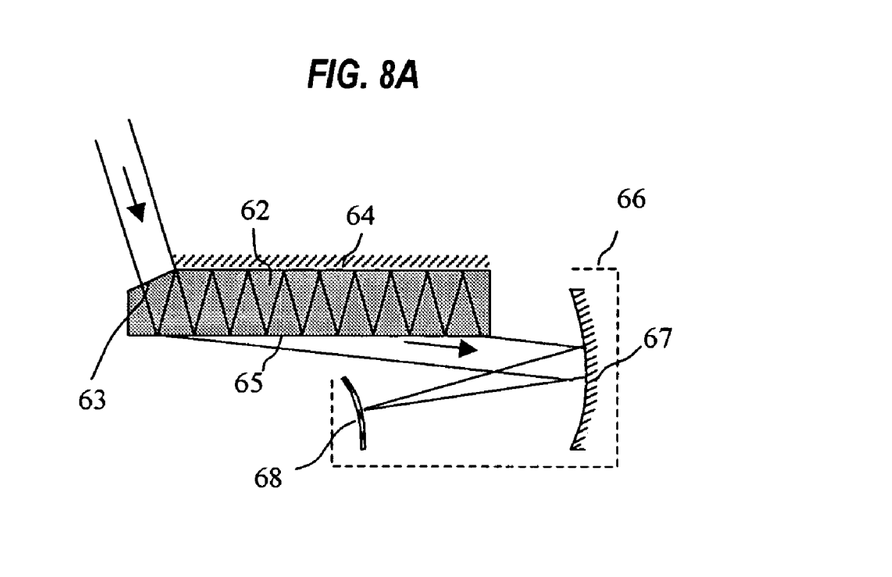
FIG. 8A is a schematic diagram illustrating an embodiment of the present invention in which the light-returning means employs a concave mirror as the light-focusing means.
Figure 8B:
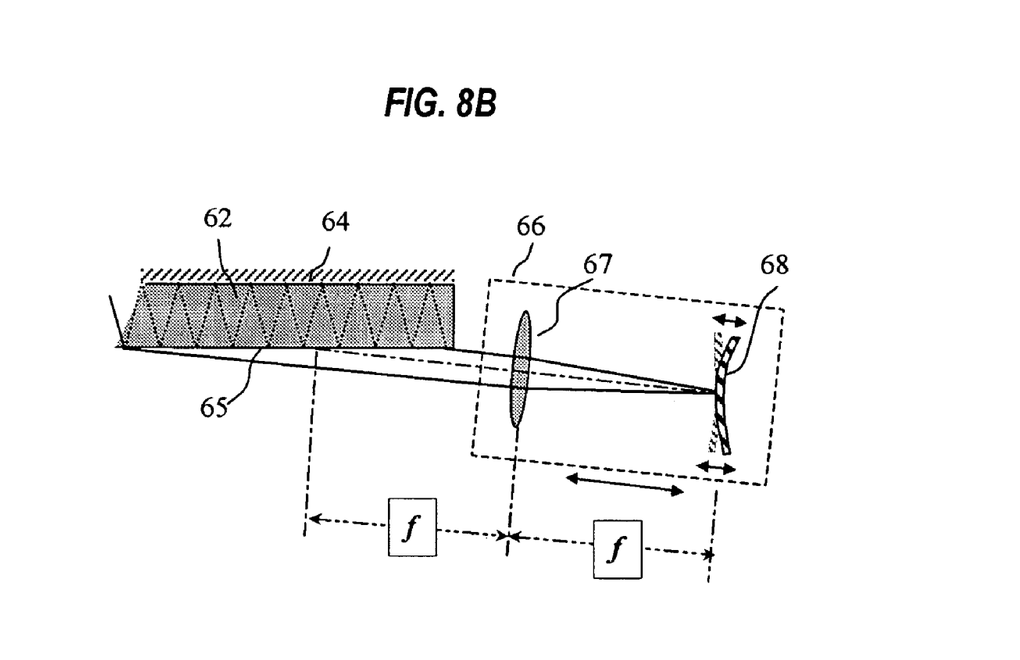
FIG. 8B is a schematic diagram illustrating locations for the light-focusing element and light-returning mirror with respect to the optical phaser for one embodiment of the present invention.

As described previously, the preferred embodiment of the light-returning means 66 includes the light-focusing element 67 and a curved mirror 68 placed near the focal plane of the light-focusing element 67. The light-focusing element 67 may be a lens as indicated in FIG. 4. Alternatively as illustrated in FIG. 8A, a concave mirror may also be used for the light-focusing element 67 in a folded configuration of the light-returning means 66. The light-focusing element 67 is preferably located along the direction of the diffracted beam emitted from the surface 65 of the optical phaser 62 at a distance, as illustrated in FIG. 8B, which is approximately one focal length, i.e. f, of the light-focusing element 67 away from the surface 65.

Figure 9A:
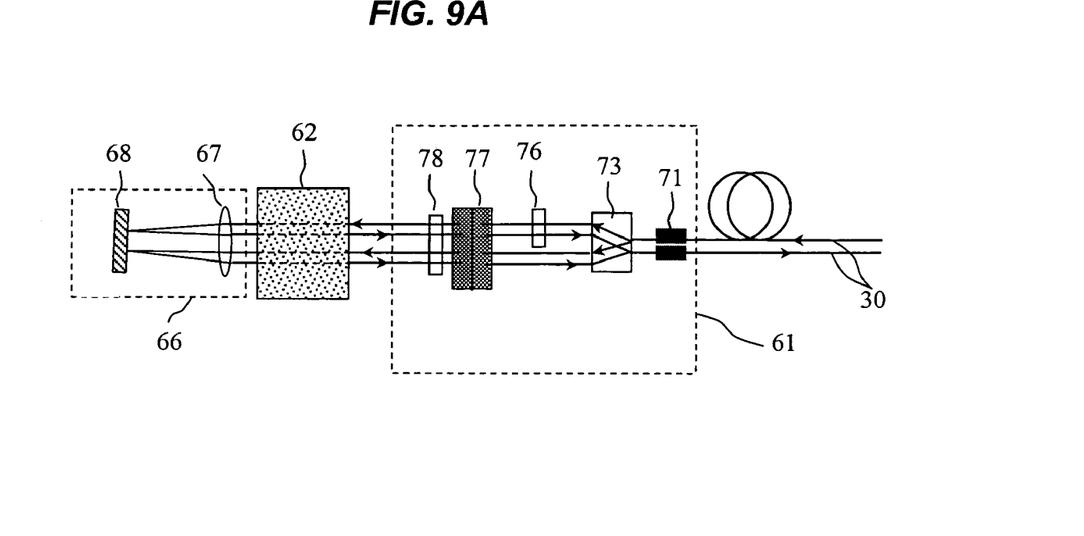
FIG. 9A is a plan view schematic diagram illustrating a method for coupling chromatic dispersion compensated light back into a communication system in accordance with one embodiment of the present invention.
Figure 9B:
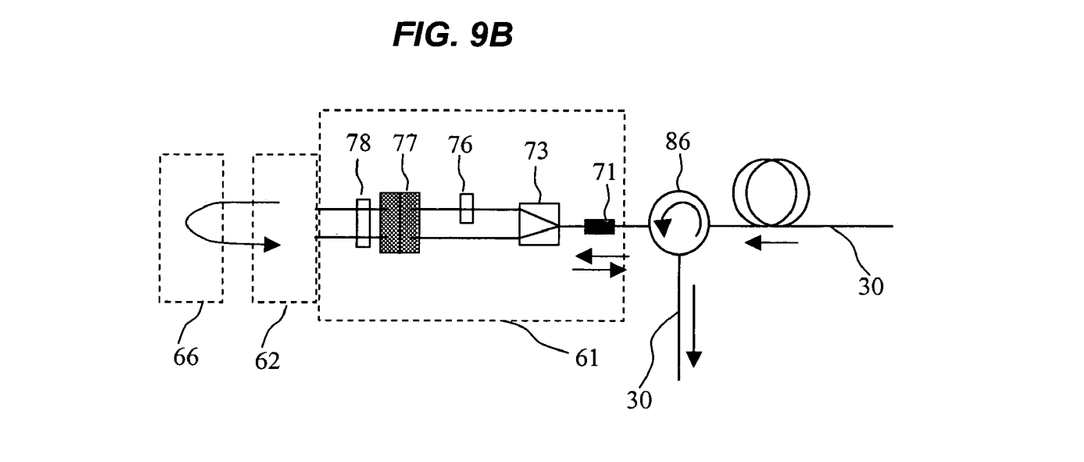
FIG. 9B is a plan view schematic diagram illustrating an alternative method for coupling light, compensated for chromatic dispersion in accordance with the present invention, back into a communication system.

In the preferred embodiment of the light-returning means 66, the light beams emerging from the surface 65 of the optical phaser 62 are collected by the light-focusing element 67 for projection onto the curved mirror 68 that is located near the focal plane of the light-focusing element 67. Reflected back by the curved mirror 68, the beams reverse their trajectory through the light-returning means 66, the optical phaser 62 to exit therefrom through the entrance window 63, and proceed through the collimator 71 of the collimating means 61. Preferably, as illustrated in the plan view of FIG. 9A, light returning through the collimator 71 can be spatially separated from light entering therethrough by slightly tilting the light-focusing element 67 perpendicular to a plane of symmetry of the dispersion compensator 60. Alternatively, as indicated in FIG. 9B light returning collinearly through the collimator 71 can also be separated from light entering the collimator 71 by a circulator 86. While FIG. 9B illustrates the circulator 86 as being located between the optical fiber 30 and the collimating means 61, alternatively the circulator 86 can be inserted between the collimating means 61 and the optical phaser 62.

The chromatic dispersion, $\beta$, produced by the dispersion compensator 60 follows a relationship (6) set forth below.

$$\beta \approx -\frac{2(n^2-1)^2 f^2}{c\lambda R \cos^2\varphi} \tag{6}$$

where

R is the radius of curvature of the curved mirror 68.

Note that R is defined as positive for a convex mirror and negative for a concave mirror. For fixed diffraction angle $\phi$ and fixed focal length f, relationship (6) indicates that the chromatic dispersion generated by the dispersion compensator 60 is directly proportional to curvature of the curved mirror 68. In particular, by adjusting the curvature of the curved mirror 68, it is always possible to completely cancel chromatic dispersion of a particular optical transmission system for a specified wavelength of light traveling therethrough.

Figure 10:
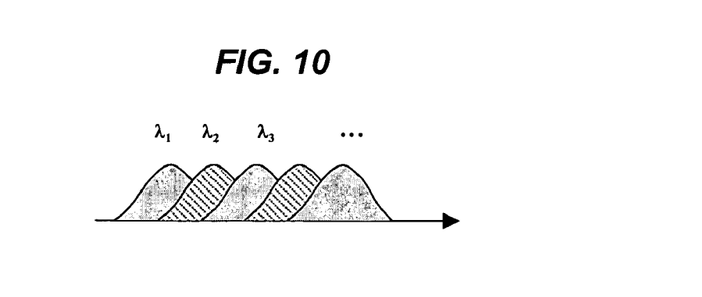
FIG. 10 is a schematic diagram illustrating intensity distributions occurring at the light-returning mirror of FIGS. 4, 8A and 9A by embodiments of the present invention for an incoming light beam that contains multiple WDM channels.

Furthermore, the small angular dispersion introduced by the prism 77 or the bulk diffraction grating 77a of the collimating means 61 produces a banded pattern that angularly disperses beams of light of differing wavelengths emerging from the surface 65 of the optical phaser 62. That is, the optical phaser 62 diffracts WDM channels having differing wavelengths of light at slightly different angles. Furthermore, light having a particular frequency within each specific band of the banded pattern is angularly displaced from light at other frequencies within that same band. Moreover, the banded pattern of angularly dispersed light generated by the optical phaser 62 exhibits a rate of angular change with respect to a center frequency within a particular band that differs from the rate of angular change with respect to center frequencies of other bands. Consequently, as indicated schematically in FIG. 10 the light-focusing element 67 projects this banded pattern for light of each WDM channel to a distinct location on the curved mirror 68 located at the focal plane of the light-focusing element 67.

Figure 11:
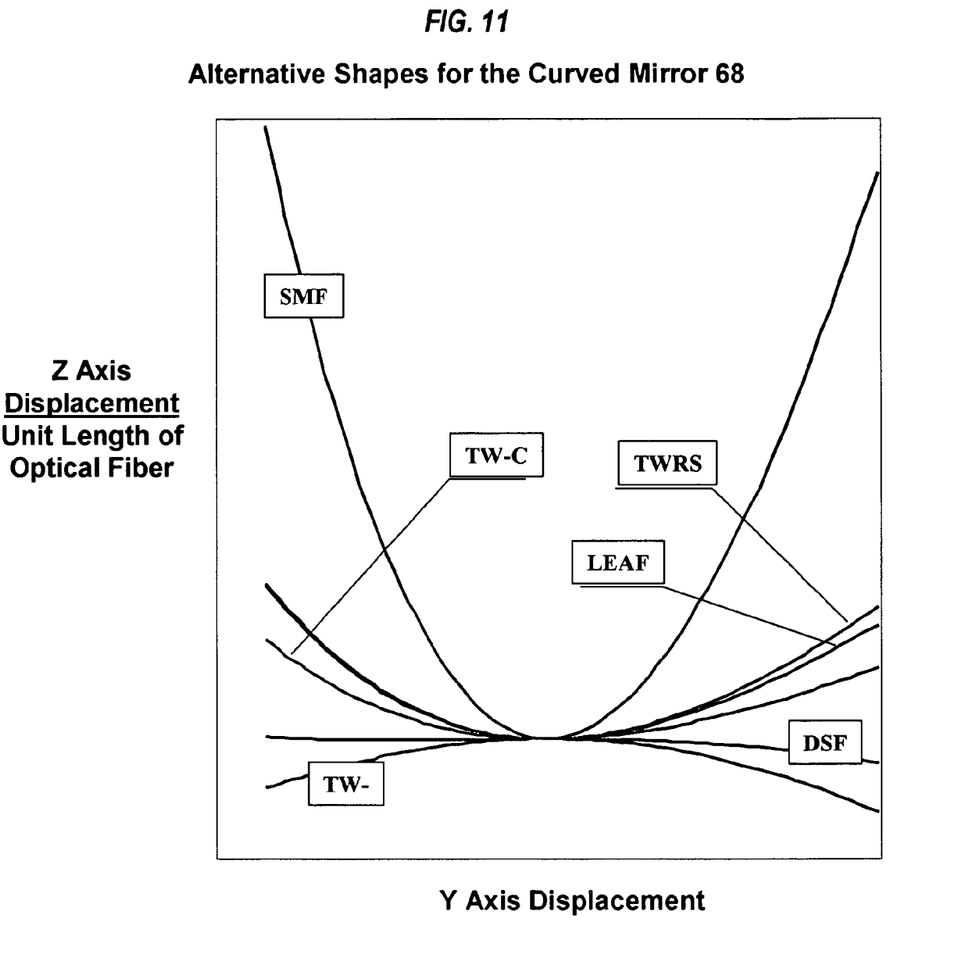
FIG. 11 is a schematic diagram illustrating various different shapes for the light-returning mirror of FIG. 4 in accordance with the present invention which respectively fully compensate chromatic dispersion exhibited by various types of commercially available optical fibers.

Projection of the banded pattern by the light-focusing element 67 to distinct locations on the curved mirror 68 may be exploited advantageously if the curved mirror 68 has a curvature which varies across the focal plane of the light-focusing element 67. Employing a curved mirror 68 having an appropriately varying curvature permits the dispersion compensator 60 to concurrently compensate for chromatic dispersion for all WDM channels propagating through the optical fiber 30. FIG. 11 displays preferred shapes for the curved mirror 68 of exemplary embodiments of the dispersion compensator 60 that fully compensate GVD and dispersion slope for various different types of commercially available optical fibers 30.

In one exemplary embodiment of the dispersion compensator 60, the optical phaser 62 is made from a plate of silicon that is approximately 1 mm thick. In accordance with the various embodiments for the optical phaser 62 depicted in FIGS. 7A–7F, the entrance window 63 is formed on an outer surface of the plate. The reflective surface 64 has a gold coating, and the refractive surface 65 is polished. The beam incidence angle $\theta$ inside the optical phaser 62 is approximately sixteen degrees (16°), and the focal length of the light-focusing element 67 is approximately 100 mm.

The dispersion compensator 60 of the present invention provides several advantages and distinctions of over existing dispersion compensation devices.

First, the dispersion compensator 60 enables independent control both of GVD and of dispersion slope. Specifically, for any optical fiber 30 of a specified length, its GVD can be compensated by an appropriate curvature of the folding curved mirror 68, and its dispersion slope can be compensated by appropriate curvature variations of the same folding curved mirror 68.

Second, the nearly collimated beam inside the optical phaser 62 concentrates energy of the diffracted light into a few diffraction orders for any beam of light at a particular wavelength, resulting in broad pass-band width and minimum throughput loss. For example, the dispersion compensator 60 of the present invention exhibits a 0.5 dB bandwidth greater than 40 GHz for a WDM system having immediately adjacent channels spaced 100 GHz apart.

Third, according to relationship (6), the GVD and dispersion slope produced by the dispersion compensator 60 change linearly with curvature of the folding curved mirror 68. Therefore, the shape of the curved mirror 68 that provides full GVD and dispersion slope compensation for an optical system is uniquely determined by the type of optical fiber 30, and changes linearly with the length of the optical fiber 30. Accordingly, in FIG. 11 the vertical axis associate with the graphic depiction of various curvatures for different curved mirrors 68 is normalized to the length of the various different optical fibers 30.

Fourth, the dispersion compensator 60 can be designed with minimum dispersion slope, for example, by setting the radius of the folding curved mirror 68 in accordance with the following relationship (7).

$$R\cos^2\phi \approx \text{cons tan t} \tag{7}$$

The dispersion compensator 60 equipped with a curved mirror 68 in accordance with relationship (7) can be useful for compensating chromatic dispersion in optical communication systems where:

1. the wavelength of the light is unstable, such as that from an uncooled laser; or
2. the spectrum of the light is broad, such as that from a directly modulated laser.

Figure 12:
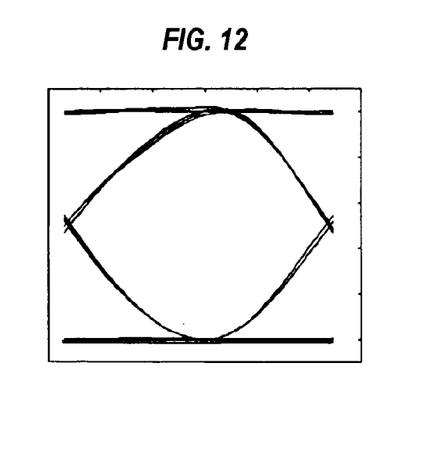
FIG. 12 is an eye-diagram depicting results for a simulation of a 10 Gbps fiber optical transmission system containing 4000 km of optical fiber compensated by dispersion compensators in accordance with present invention that are spaced at 80 km apart along the length of the optical fiber.

Finally, the dispersion compensator 60 introduces little dispersion ripple into light propagating through an optical communication system. Therefore, the dispersion compensator 60 can be used for terminal chromatic dispersion compensation, as well as for inline chromatic dispersion compensation of long-haul fiber optical systems. For inline chromatic dispersion compensation of long-haul fiber optical systems a number of dispersion compensators 60 are installed at spaced apart locations along the optical fiber 30 inline with the optical fiber 30. For example, FIG. 12 displays a eye-diagram results from a simulation of a 10 Gbps fiber optical transmission system containing 4000 km of fiber compensated by dispersion compensators 60 of the present invention spaced at 80 km apart along the optical fiber 30. As is apparent to those skilled in the art, the eye-diagram of FIG. 12 exhibits little degradation due to chromatic dispersion.

Although the present invention has been described in terms of the presently preferred embodiment, it is to be understood that such disclosure is purely illustrative and is not to be interpreted as limiting. For example, the embodiments of the dispersion compensator 60 described above preferably include a prism 77 or bulk diffraction grating 77a to provide angular dispersion of light emitted from the collimating means 61 that impinges upon the entrance window 63. However, it is not intended for the dispersion compensator 60 as encompassed in the following claims necessarily include such an angular dispersion element. As stated previously, in applications of the dispersion compensator 60 in which dispersion slope compensation is not critical, any other type of mode coupler that produces a nearly collimated beam of light with efficient optical coupling between the optical fiber 30 and the optical phaser 62 may be employed as the collimating means 61. Such a coupler may simply be a standard optical collimator.

As described above, the entrance window 63 of the optical phaser 62 is preferably coated with an antireflective film. However, it is not intended that the dispersion compensator 60 as encompassed in the following claims necessarily have such a coating. The only requirement is that the entrance window 63 of the optical phaser 62 must simply be partially transparent at the wavelength of light impinging thereon.

In the above embodiments of the present invention, the birefringent plate 73 and the half-wave plates 76, 78 linearly polarize the beam of light received from the optical fiber 30 before suitably polarized beams impinge on the prism 77 and the optical phaser 62 to become angularly dispersed thereby. However, it is not intended that the dispersion compensator 60 as encompassed by the following claims be limited to using these specific polarization components. Instead, the dispersion compensator 60 simply requires that an appropriately polarized beam of light impinge on the entrance window 63 of the optical phaser 62.

Further, as described above the parallel surfaces 64, 65 of the optical phaser 62 may be coated with films such that the corresponding reflectivities are insensitive to beam polarizations. If such coatings are applied to the parallel surfaces 64, 65, then polarization of the beam of light impinging upon the entrance window 63 need not be controlled, and the polarization control components, e.g. the birefringent plate 73 and the half-wave plates 76, 78, may be eliminated from the collimating means 61. Analogously, to increase optical efficiency an antireflective coating may be advantageously applied to the light-focusing element 67 to reduce loss of light passing through a lens. For optical efficiency it is also advantageous if the curved mirror 68 have a highly reflective coating.

As described above, the preferred spacing between the surface 65 of the optical phaser 62 and the light-focusing element 67 equals the focal length, f, of the light-focusing element 67. However, the dispersion compensator 60 encompassed by the following claims is not limited to that specific geometry. Instead, the distance between the focusing element 66 and the surface 64 of the phaser 61 may be set to any value. As described in greater detail below, that distance may, in fact, even be adjustable.

In general, the chromatic dispersion produced by the apparatus of the present invention is related to its geometry by the following relationship (8).

$$\beta \propto \left( f - u + \frac{f^2}{R} \right) \quad (8)$$

where
u is the distance from the surface 65 of the optical phaser 62 to the light-focusing element 67 along the optical axis of the light-focusing element 67 f the focal length of the light-focusing element 67
R the radius of curvature of the folding curved mirror 68.

A tunable dispersion compensator 60 in accordance with the present invention can be implemented by adjusting u, or R or both u and R. For the adjustment of u, a preferred embodiment of the dispersion compensator 60 is to place the light-returning means 66 on a translation stage, as indicated in FIG. 4 by an arrow 69. Alternatively, the curved mirror 68 can be made with adjustable curvature.

There exist numerous different ways which may be employed to make the curvature of the curved mirror 68 adjustable. One way is to apply elastic bending forces to the curved mirror 68 in the direction indicated in FIG. 4. by arrows 70 Such bending forces may be generated mechanically such as by push screws. Alternatively, the forces may also be generated electrostatically or electromagnetically such as by a micro electro-mechanic system. The curvature of the curved mirror 68 may also be adjusted thermally if the mirror is formed from a bi-metallic material. Optimal mirror shapes may be achieved by forming the curved mirror 68 to have varying stiffness, or by applying bending forces at multiple locations on the curved mirror 68, or by a combination of both techniques. Translating a curved mirror 68 having uneven curvatures that is located near the focal plane of the light-focusing element 67 transverse to the optical axis thereof, i.e. translating along the focal plane of the light-focusing element 67, also adjusts the curvature of the curved mirror 68. The curvature of the curved mirror 68 may also be adjusted by replacing a curved mirror 68 having a particular shape with another one having a different shape.

Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. An optical chromatic dispersion compensator adapted for bettering performance of an optical communication system comprising:
   a collimating means for receiving a spatially diverging beam of light which contains a plurality of frequencies as may be emitted from an end of an optical fiber included in an optical communication system, the collimating means also converting the received spatially diverging beam of light into a mainly collimated beam of light that is emitted from the collimating means;
   an optical phaser which provides an entrance window for receiving the mainly collimated beam of light from the collimating means and for angularly dispersing the received beam of light in a banded pattern that is emitted from the optical phaser, whereby the received beam of light becomes separated into bands so that light having a particular frequency within a specific band is angularly displaced from light at other frequencies within that same band; and
   a light-returning means which receives the angularly dispersed light having the banded pattern that is emitted from the optical phaser, and for reflecting that light back through the optical phaser to exit the optical phaser near the entrance window thereof.

2. The compensator of claim 1 wherein the mainly collimated beam of light emitted from the collimating means has a divergence which ensures that more than fifty-percent (50%) of energy in the mainly collimated beam of light impinging upon the entrance window diffracts into fewer than three (3) diffraction orders for any beam of light at a particular wavelength in the angularly dispersed light emitted from the optical phaser in the banded pattern.

3. The compensator of claim 1 wherein light enters the optical phaser through the entrance window at near normal incidence.

4. The compensator of claim 1 wherein the entrance window of the optical phaser is at least partially transparent to light impinging thereon.

5. The compensator of claim 1 wherein the light-returning means includes a light-focusing means and a mirror disposed near a focal plane of the light-focusing means, the light-focusing means collecting the angularly dispersed light having the banded pattern emitted from the optical phaser for projection onto the mirror, the mirror reflecting light impinging thereon back towards the light-focusing means.

6. The compensator of claim 5 wherein the light-focusing means projects to a distinct location on the mirror each band in the banded pattern of angularly dispersed light generated by the optical phaser.

7. The compensator of claim 5 wherein a distance between the light-focusing means and the optical phaser is adjustable.

8. The compensator of claim 5 wherein the mirror is curved.

9. The compensator of claim 8 wherein curvature of the mirror is adjustable.

10. The compensator of claim 9 wherein curvature of the mirror is adjusted by bending the mirror.

11. The compensator of claim 10 wherein force for bending the mirror is selected from a group consisting of mechanical, electrical, magnetic and thermal.

12. The compensator of claim 9 wherein the mirror has multiple curvatures, and curvature of the mirror is adjusted by translating the mirror.

13. The compensator of claim 9 wherein the mirror is replaceable, and curvature of the mirror is adjusted by replacing the mirror with another mirror having a different curvature.

14. The compensator of claim 1 wherein the optical phaser is made from a plate of material having two parallel surfaces between which light after entering the optical phaser through the entrance window reflects, and with the entrance window being formed on an outer surface of the plate.

15. The compensator of claim 14 wherein the entrance window is formed by a beveled edge of the plate.

16. The compensator of claim 14 wherein the entrance window is formed by a prism which projects out of one of the two parallel surface of the optical phaser, and light entering the optical phaser through the entrance window undergoes internal reflection within the prism before impinging upon one of the two parallel surface.

17. The compensator of claim 14 wherein one of the two parallel surface of the optical phaser is partially transparent to allow a portion of light impinging thereon to exit the optical phaser.

18. The compensator of claim 17 wherein light emitted from the optical phaser through the partially transparent surface defracts at an angle which exceeds forty-five degrees (45°) from a normal thereto.

19. The compensator of claim 1 wherein the optical phaser is made from a material having an index of refraction which is greater than the index of refraction of medium surrounding the optical phaser.

* * * * *